United States Patent Office 3,154,514
Patented Oct. 27, 1964

3,154,514
ETHYLENE OXIDE POLYMERS HAVING
IMPROVED STRESS ENDURANCE
George B. Kelly, Jr., South Charleston, W. Va., assignor to Union Carbide Corporation, a corporation of New York
No Drawing. Filed Dec. 5, 1960, Ser. No. 73,548
14 Claims. (Cl. 260—33.2)

This invention relates, in general, to ethylene oxide polymers. In one aspect, this invention relates to films and other articles prepared from ethylene oxide polymers which have improved stress endurance and other desirable features.

In recent years, one of the more outstanding developments of the chemical industry has been the expansion and growth in the use of various polymeric materials for producing films, sheets, moldings, extrusions and the like. Of current interest are the water-soluble resins prepared by the polymerization of lower alkylene oxides, such as ethylene oxide, to polymeric compounds having molecular weights in the range of from about one hundred thousand to about ten million, and higher. Films, sheets, and other articles composed of these high molecular weight polymers can be produced by casting from aqueous or organic solvents, by thermoplastic forming processes, such as calendering, rolling, extrusion, and the like, or by mechanical means from plastic water gels of the polymer. Irrespective of the method of production, the films, sheets, moldings and other articles prepared therefrom, exhibit many desirable and unique features. Thus, while the resulting articles are tough, inherently flexible, highly extensible and impact resistant, they are also readily soluble in water. Additionally, the articles composed of the ethylene oxide polymers are resistant to greases, oils, and numerous solvents. In view of the aforementioned features, these materials have been found particularly attractive for use as water-soluble packaging films, molded articles, warp sizes, and the like.

Notwithstanding the numerous desirable features inherent in articles prepared from ethylene oxide polymers, it has been observed that when relatively small constant stresses are applied for extended periods of time to materials prepared from these polymers, crazing and tensile failure occur at relatively low loads per square inch. This type of failure in materials composed of ethylene oxide polymers is generally referred to as "stress cracking" and is quite prevalent in films and sheets where it is most noticeable. Moreover, stress cracking appears to be especially serious in most highly crystalline polymers such the high molecular weight poly(ethylene oxides). The highly crystalline polyethylenes are also particularly subject to a variety of stress cracking problems. For instance, stress cracking has been observed in polyethylene wire coatings particularly where high temperatures are encountered, such as might be found in electric motors and the like. However, the stress cracking problem is found to be more pronounced with the high molecular weight poly(ethylene oxides), even to a degree not encountered in other known polymers.

The practical effect of stress cracking in various films, sheets, and moldings composed of poly(ethylene oxide) is mostly undesirable and on many occasions will render the material unsuitable for its intended use. In many instances the stress cracking effect can be readily observed in film wound onto a roll. Even though the film on such a roll is under relatively low tension stress, as well as very low elongation, stress cracking failure will often occur at several points in each lap of the roll, causing the entire roll of film literally to fall off in numerous pieces. In a similar manner, stress cracking will often occur where a film has been creased or where molded or extruded shapes have been deformed slightly. Likewise, poly(ethylene oxide) when employed as a coating on cotton or other yarns as a warp size will, in some instances, exhibit stress cracking after the sized yarn has been stored for extended periods of time. This undoubtedly results in poor weaving efficiencies when such yarns are converted to textiles.

Heretofore, several known methods have been employed to alleviate stress cracking in articles prepared from highly crystalline resins. For example, the addition of such materials as fillers or other resins, and the like was generally believed beneficial to reduce stress cracking by breaking up the symmetrical crystalline structure. Furthermore, stress cracking has been alleviated by annealing or tempering treatments whereby the resin crystallites are made smaller or by subjecting the film to orientation so that the crystallites are in a more favorable condition for resisting failure.

However, each of the aforesaid methods is not without its disadvantages. The use of fillers or additives may have the undesirable effect of rendering the properties of some resin compositions unsuitable for their intended use. Moreover, additives have been known to alter the heat distortion temperature, lower the melting point, as well as greatly reducing the tensile strength. Prior to the instant invention it had been believed that in the case of the high molecular weight poly(ethylene oxides) the improvements in stress endurance from such treatments, if any, is relatively insignificant compared to the undesirable characteristics imparted to the material. Similarly, the attempted use of known additives in the case of poly(ethylene oxides) had largely proved ineffectual in producing a stress endurant composition at the time of this invention.

Accordingly, one or more of the following objects will be achieved by the practice of the instant invention. It is an object of the present invention to provide films and other articles composed of ethylene oxide polymers wherein the stress endurance is substantially improved. Another object of the present invention is to provide films of ethylene oxide polymers having greatly improved stress endurance, and other desirable features. A further object is to provide films of ethylene oxide polymers which have a high degree of clarity. A still further object of the present invention is to provide films of poly(ethylene oxide) having improved stress endurance. Another object is to provide films, comprised of at least 90 weight percent of ethylene oxide in copolymerized form with up to 10 weight percent of lower olefin oxides, such as propylene oxide, butylene oxide, and the like, which have improved stress endurance and other desirable features. A further object of the present invention is to provide a novel process for improving the stress endurance of films and other articles composed of ethylene oxide polymers. Another object is to provide a novel process for improving the stress endurance of films composed of solid poly(ethylene oxide). A still further object of the present invention is to provide a novel process for improving the stress endurance of films comprised of at least 90 weight percent of ethylene oxide in copolymerized form with up to 10 weight percent of lower olefin oxides. These and other objects of the present invention will readily become apparent to those skilled in the art in the light of the teachings herein set forth.

In accordance with the present invention it has been found that the stress endurance of films and other objects composed of ethylene oxide polymers can be considerably enhanced or improved by mixing with the polymer, a stress improving amount of a stress-improving additive characterized by the following formula:

$$R\text{-}[\text{---}O\text{---}CH_2CH_2)_n\text{---}OX]_m$$

wherein R contains from 5 to 24 carbon atoms and represents a member selected from the group consisting of alkyl-substituted and unsubstituted cycloaliphatic, heterocyclic and aryl groups, X represents a member selected from the group consisting of hydrogen, lower alkyl, and alkyl-substituted and unsubstituted cycloaliphatic, heterocyclic and aryl groups containing from 5 to 24 carbon atoms; $n$ is a whole positive integer of from 2 to 60; and $m$ is a whole positive integer of from 1 to 3.

Preferred additives suitable for use in the process of the instant inevntion are those represented by the aforesaid formula wherein R represents phenyl, phenylene, alkylphenyl, alkylphenylene, polyalkylphenyl, polyalkylphenylene, arylphenyl, arylphenylene, aralkylphenyl, aralkylphenylene, naphthyl, naphthylene, alkylnaphthyl, polyalkylnaphthyl, alkylnaphthylene, polyalkylnaphthalene, anthryl, anthrylene, alkylanthryl, alkylanthrylene, phenanthryl, phenanthrylene, alkylphenanthryl, alkylphenanthrylene, benzyl, acylamino, aryldiamino, diarylamino, alkarylamino, alkaryldiamino, arylisocyanato, aryldiisocyanato, alkarylisocyanato, alkaryldiisocyanato, cyclohexyl, cyclohexylene, alkylcyclohexyl, alkylcyclohexylene, cycloheptyl, cycloheptylene, alkylcycloheptyl, alkylcycloheptylene, pyrrolidinyl, pyrrolidinylene, piperidyl, piperidylene, pyrrolyl, pyrrolylene, pyridyl, pyridylene, and the like; and X represents hydrogen, methyl, ethyl, propyl, butyl, phenyl, alkylphenyl, arylphenyl, naphthyl, alkylnaphthyl, polyalkylnaphthyl, anthryl, phenanthryl, alkylphenanthryl, benzyl, cyclohexyl, alkylcyclohexyl, cycloheptyl, piperidyl, pyridyl, and the like. When X represents other than hydrogen, it preferably contains from 1 to 24 carbon atoms.

The alkyl-substituted R groups preferably can contain from about 1 to about 12 carbon atoms in the alkyl moiety either as a straight or branched chain and can include such groups as methyl, ethyl, propyl, isopropyl, butyl, tertiary-butyl, hexyl, octyl, vinyl, dodecyl and the like.

Additives suitable for use in the present invention, include, among others, such compounds as the nonylphenyl ethers of polyglycols having from 1 to 60 oxyethylene units, the cyclohexyl ethers of polyethylene glycol with from 1 to about 60 oxyethylene units, alpha naphthyl ether of polyethylene glycol with from 1 to about 60 oxyethylene units, tris(hydroxyphenyl) propane-ethylene oxide adduct with each of three chains averaging 2.96 oxyethylene units per chain, p,p'-diaminodiphenylmethane-ethylene oxide adduct with an average of 1.92 oxyethylene units per chain, 2,4-toluenediamine-ethylene oxide adduct with 4 chains averaging 3.1 oxyethylene units per chain, ortho-tolyl diethanolamine-ethylene oxide adduct with 2 chains averaging 1 oxyethylene unit per chain, phenylisocyanate-polyethylene glycol adduct, isopropanol-toluenediisocyanate-polyethylene glycol adduct, and the like.

In a preferred embodiment of the present invention, the stress improving additives can be conveniently represented by the formula:

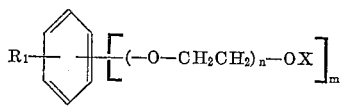

wherein $R_1$ represents an alkyl group containing from 1 to 12 carbon atoms, and X, $n$ and $m$ have the same values as previously indicated. Particularly preferred additives are those represented by the aforementioned formula wherein $R_1$ contains from 2 to 10 carbon atoms, X represents hydroxyl, methoxyl or ethoxyl, $n$ is a whole positive integer of from 15 to 35; and $m$ is a whole positive integer of from 1 to 2.

Illustrative additives encompassed by this embodiment and which can be empolyed in the process of the instant invention include, among others, nonylphenyl polyglycol ether with 4 oxyethylene units, nonylphenyl polyglycol ether with 10 oxyethylene units, nonylphenyl polyglycol ether with 15 oxyethylene units, nonylphenyl polyglycol ether with 20 oxyethylene units, nonylphenyl polyglycol ether with 35 oxyethylene units, nonylphenyl polyglycol ether with 40 oxyethylene units, nonylphenyl polyglycol ether with 60 oxyethylene units, phenyl polyglycol ether with 20 oxyethylene units, tertiary butylphenyl polyglycol ether with 20 oxyethylene units, dodecylphenyl polyglycol ether with 6 oxyethylene units, dodecylphenyl polyglycol ether with 12 oxyethylene units, and the like.

In general, the concentration of stress improving additive should be from about 1 to about 50 weight percent, based on the weight of polymer and more preferably from about 12 to about 25 weight percent. Concentrations of additive above and below the aforesaid broad range can also be employed but are less preferred.

The technique by which the aforesaid additives are incorporated or admixed with the ethylene oxide polymer is not critical, and any of a variety of means can be employed to effect intimate admixing of polymer and additive. Suitable methods involve the admixture of the polymer and additive by such means as a dry blender, Banbury mixer, two-roll mill, and the like. These blending techniques, and others, are well known in the art and modifications thereof will become apparent in view of the teachings of the present invention. The mixture of polymer and additive can then be converted to films or sheets by any suitable technique such as calendering or extruding.

Although the stress improving additives employed in the process of the instant invention will, in many instances, have a noticeable plasticizing effect on the films, it should be understood that the improvement of the instant process is not merely confined to enhanced calendering and extruding properties. Many known commercial plasticizers, as hereinafter demonstrated, will confer softness, flexibility, and improved milling characteristics to the polymer yet fail to give any increase in the stress endurance of the resulting films.

A particularly unique and highly desirable feature of films prepared by the process of this invention is their use as water-soluble unit packages and containers for soaps, detergents, and the like. In addition to improved stress endurance, imparted by the additive, many of the additives themselves possess detergent, emulsifying, and wetting characteristics. For instance, the alkylphenyl ethers of polyethylene glycol sold under the trade name Tergitol Nonionics are excellent stress improving additives as well as surface active agents. Thus, it is possible to prepare films characterized by improved stress endurance which at the same time have "built-in" surface active agents.

The poly(ethylene oxide) films which have been prepared according to the teachings herein disclosed readily dissolve in water; moreover, the novel films are essentially not effected in storage or in transit under ordinary conditions of humidity. Unit packages and containers prepared from the novel films of this invention can be employed as air tight containers for materials such as hydrocarbon oils, detergents, insecticides, fungicides, motor oil, and the like and stored for extended periods of time without noticeable deterioration of the container. In addition, these packages can be sealed, after insertion of the desired material therein, by such means as, for example, heat-sealing, electronic sealing, conventional adhesives, or other techniques well-known in the art. Unit packages and containers produced from the novel films of this invention can take the form of boxes, tubes, packets and the like. It is to be understood that these novel films are not limited to use in unit packaging but can be employed in general use where the characteristics possessed by these films are desired.

The ethylene oxide polymers which can be utilized by the practice of instant invention include the water-soluble ethylene oxide homopolymers and ethylene oxide copolymers comprised of at least 90 weight percent of ethylene oxide in copolymerized form with up to 10 weight percent of a lower olefin oxide which is selected from the group consisting of propylene oxide and butylene oxide. The polymers should have a reduced viscosity, as hereinafter defined, of from about 1 to about 75 and higher, and preferably between 2 and 30, and more preferably between 4 and 8.

The preparation of poly(ethylene oxide) having a reduced viscosity in acetonitrile in the range from about 1.0 to about 60, and higher, is the subject matter of the application entitled "Polymerization of Epoxides and New Products Obtained Thereby," by F. N. Hill, J. R. Fitzpatrick, and R. E. Bailey, Jr., Serial No. 587,955, filed May 29, 1956, and now abandoned. This application teaches the preparation of poly(ethylene oxide) by the suspension polymerization of ethylene oxide in contact with about 0.2 to about 10 parts by weight, per 100 parts by weight of monomer, of a catalyst such as the alkaline earth metal amides, hexammoniates, or mixtures thereof. The polymerization reaction is preferably conducted at a temperature in the range from about 0° C. to 70° C. in the presence of a liquid organic medium such as the normally liquid straight and branch chain saturated hydrocarbons, cyclic and alkyl-substituted cyclic saturated hydrocarbons, and the like, e.g. heptane, methylcyclopentane, etc., in which the ethylene oxide reagent is soluble and the resulting polymer is insoluble. Agitation of the reaction mixture during the polymerization results in the production of granular ethylene oxide polymer having a reduced viscosity in acetonitrile above about 1.0, and generally above about 30 and up to 60, and higher. The granular poly(ethylene oxide) can be recovered from the reaction mixture by decanting the organic medium and vacuum drying the ethylene oxide polymer. The poly-(ethylene oxide) is obtained in a granular state.

By the term "reduced viscosity," as used herein, is meant a value obtained by dividing the specific viscosity by the concentration of the polymer in the solution, the concentration being measured in grams of polymer per 100 milliliters of solvent at a given temperature, and is regarded as a measure of molecular weight. The specific viscosity is obtained by dividing the difference between the viscosity of the solution and the viscosity of the solvent by the viscosity of the solvent. Unless otherwise stated, the reduced viscosities herein referred to are measured at a concentration of 0.2 gram of polymer in 100 milliliters of acetonitrile at 30° C. Also, unless otherwise stated herein, the reduced viscosity of poly(ethylene oxide) is a value of at least 1.0 and upwards to 75, and higher.

The term "aqueous viscosity," as used herein, refers to the viscosity of the stated concentration of polymer in water, as measured at two revolutions per minute on a Model RVF Brookfield Viscometer at ambient room temperature, i.e., about 24° C. to 27° C.

EXAMPLE 1

A 100-gram sample of poly(ethylene oxide) resin having a viscosity in water of about 10,000 centipoises as measured at a concentration of 5 percent at 25° C., was fluxed on a two-roll mill with the rolls heated to approximately 140° C., with 50-pound steam. As the resin started to flux, 30 grams of a stress improving additive, nonylphenyl polyethylene glycol ether having 15 oxyethylene units, was added in a melted stated. The resin and additive were blended for 5 minutes by the usual cutting and folding techniques. The rolls were then adjusted to a 5-mil clearance and the resulting film removed and placed on a smooth metal sheet to cool. A second film of poly(ethylene oxide) resin was prepared without the additive. Comparison of the two films showed that the one containing the additive was softer, more flexible, had a much greater elongation at break, and a smoother finish. A strip of each film having a width of one-half inch was cut in such a manner that its length was parallel to the direction of exit from the two-roll mill. The film was stretched 5 percent in length and the ends clamped in the stretched position. The film strip prepared from the poly(ethylene oxide) containing the additive endured the stress for 110 hours before breaking, while the strip prepared without the additive lasted only 2.8 hours before breaking.

EXAMPLES 2–21

Samples of poly(ethylene oxide) film 6-mils thick and containing the stress improving additives indicated in Table I, were prepared on a two-roll mill, in a manner similar to that described in the previous example. The poly(ethylene oxide) polymer employed was characterized by a viscosity of 8,000 to 16,000 centipoises as measured at a concentration of 5 percent in a water solution at 25° C. For each hundred parts by weight of polymer there was added 30 parts by weight of additive. A strip of each film having a width of one-half inch was cut in such a manner that its length was parallel to the direction of exit from the two-roll mill. The film was stretched 5 percent in length and the ends clamped in the stretched position. Measurements were made of the time necessary before breaking occurred. The results of the experiments are tabulated in Table I as follows:

*Table I*

EFFECT OF ADDITIVE ON STRESS ENDURANCE OF POLY(ETHYLENE-OXIDE) FILM

| Example | Additive | Amount, parts per hundred of resin | Plasticization | Stress Endurance, 5 percent Stretch hours to break |
|---|---|---|---|---|
| 1 | Nonylphenyl polyglycol ether with 4 oxyethylene units. | 30 | Good | 26. |
| 2 | Nonylphenyl polyglycol ether with 10 oxyethylene units. | 30 | do | 62. |
| 3 | Nonylphenyl polyglycol ether with 15 oxyethylene units. | 30 | do | 110. |
| 4 | Nonylphenyl polyglycol ether with 20 oxyethylene units. | 30 | do | Over 500. |
| 5 | Nonylphenyl polyglycol ether with 35 oxyethylene units. | 30 | do | 132. |
| 6 | Nonylphenyl polyglycol ether with 40 oxyethylene units. | 30 | do | 20. |
| 7 | Nonylphenyl polyglycol ether with 60 oxyethylene units. | 30 | Fair | 16. |
| 8 | Phenyl polyglycol ether with 30 oxyethylene units. | 30 | do | 20. |
| 9 | Tert-butyl phenyl polyglycol ether with 20 oxyethylene units. | 30 | Good | Over 500. |
| 10 | Dodecylphenyl polyglycol ether with 6 oxyethylene units. | 30 | do | 22. |
| 11 | Dodecylphenyl polyglycol ether with 12 oxyethylene units. | 30 | do | 24. |
| 12 | Nonyl-o-cresyl polyglycol ether with 10 oxyethylene units. | 30 | do | 42. |

Table I—Continued

EFFECT OF ADDITIVE ON STRESS ENDURANCE OF POLY(ETHYLENE-OXIDE) FILM

| Example | Additive | Amount, parts per hundred of resin | Plasticization | Stress Endurance, 5 percent Stretch hours to break |
|---|---|---|---|---|
| 13 | Nonylphenyl polyglycol ether with 10 oxyethylene units and terminal OH replaced with (OCH$_2$CH$_3$). | 30 | ___do___ | Over 500. |
| 14 | Cyclohexyl ether of polyethylene glycol (25 oxyethylene units). | 30 | ___do___ | Over 120. |
| 15 | α-Naphthyl ether of polyethylene glycol (25 oxyethylene units). | 30 | ___do___ | 50. |
| 16 | Trishydroxyphenyl propane ethylene oxide adduct (3 chains averaging 2.96 oxyethylene units per chain). | 30 | ___do___ | 96. |
| 17 | p,p'-diaminodiphenylmethane, ethylene oxide adduct (average 1.92 oxyethylene per chain). | 30 | ___do___ | 144. |
| 18 | 2,4-toluenediamine, ethylene oxide adduct (4 chains averaging 3.1 oxyethylene units per chain). | 30 | ___do___ | Over 24. |
| 19 | o-Tolyl diethanolamine, ethylene oxide adduct (2 chains averaging 1 oxyethylene unit per chain). | 30 | Fair | Over 8. |
| 20 | Phenylisocyanate-polyethylene glycol product.[a] | 30 | Good | 96. |
| 21 | Isopropanol-toluenediisocyanate-polyethylene glycol reaction product.[a] | 30 | ___do___ | 144. |

[a] Polyethylene glycol with an average molecular weight of 570–630.

EXAMPLES 22–36

In order to demonstrate that the improvement in stress endurance was not merely the result of plasticization, additional samples of poly(ethylene oxide) film 6-mils thick were prepared containing the plasticizers listed in Table II. The poly(ethylene oxide) used was the same as that used in the previous examples. For each hundred parts by weight of polymer there wash added 30 parts by weight of plasticizer. Film samples were prepared in a manner similar to that employed in Examples 2–21. Each of the film samples was cut into one-half inch strips as indicated in the previous examples, stretched 5 percent in length, and the ends clamped in the stretched position. Measurements were made of the time necessary before breaking occurred. The results of the experiment are tabulated in Table II as follows:

Although the invention has been illustrated by the preceding examples, the invention is not to be construed as limited to the materials therein, but rather, the invention encompasses the generic area as hereinbefore disclosed. Various modifications and embodiments of this invention can be made without departing from the spirit and scope thereof.

What is claimed is:

1. A process for improving the stress endurance of articles comprised essentially of ethylene oxide polymers, said polymers having a reduced viscosity value of at least 1.0 as measured at a concentration of 0.2 gram of said polymer in 100 milliliters of acetonitrile at 30° C., which comprises adding to said polymer from about 1 to about 50 weight percent, based on said polymer, of a water-soluble stress improving additive having the formula:

$$R\text{\textlbrackdbl}(-O-CH_2CH_2)_n-OX]_m$$

Table II

EFFECT OF PLASTICIZERS ON STRESS ENDURANCE OF POLY(ETHYLENE OXIDE) FILMS

| Example | Plasticizers | Amount, parts per hundred of resin | Plasticization | Stress Endurance, 5 percent Stretch hours to break |
|---|---|---|---|---|
| 22 | None | | | 2.8 |
| 23 | Glycol triacetate | 30 | Very good | 3.0 |
| 24 | Diethylene glycol diacetate | 30 | Good | 1.0 |
| 25 | Triethylene glycol di-2-ethyl butyrate. | 30 | Fair | 3.0 |
| 26 | Triethyl citrate | 30 | ___do___ | 4.0 |
| 27 | Glycerol | 30 | ___do___ | 2.0 |
| 28 | Hexanetriol | 30 | ___do___ | 3.0 |
| 29 | 2-Ethyl-1,3-hexanediol | 30 | Good | 4.0 |
| 30 | Icosanol + 13 moles of ethylene oxide. | 30 | ___do___ | 4 |
| 31 | Di-2-ethylhexylamine + 20 moles ethylene oxide. | 30 | ___do___ | 1 |
| 32 | Di-2-ethylhexylamine + 23 moles ethylene oxide. | 30 | Good | 1 |
| 33 | Trimethylnonanol + 6 moles of ethylene oxide. | 30 | ___do___ | 4 |
| 34 | Butanol-butylene oxide-ethylene oxide adduct.[1] | 30 | ___do___ | 3 |
| 35 | Dipentaerythritol chained out with ethylene oxide.[2] | 30 | ___do___ | 3 |
| 36 | Nonylphenol + 4 moles of propylene oxide. | 30 | ___do___ | 4 |

[1] Butanol chained out with 18 moles of butylene oxide and then further chained out with 48 moles of ethylene oxide.

[2] Dipentaerythritol chained out with a mixture of 75 percent ethylene oxide and 25 percent propylene oxide to a molecular weight of 24,000.

wherein R contains from 5 to 24 carbon atoms and represents a member selected from the group consisting of alkyl-substituted and unsubstituted cycloaliphatic, heterocyclic nitrogen and aryl groups; X represents a member selected from the group consisting of hydrogen, lower alkyl, and alkyl-substituted and unsubstituted cycloaliphatic, heterocyclic nitrogen and aryl groups containing from 5 to 24 carbon atoms; $n$ is a whole positive integer of from 2 to 60; and $m$ is a whole positive integer of from 1 to 3.

2. The process of claim 1 wherein said ethylene oxide polymer is solid poly(ethylene oxide).

3. The process of claim 1 wherein said ethylene oxide polymer is a solid copolymer comprised of at least 90 weight percent of ethylene oxide in copolymerized form with up to 10 weight percent of a lower olefin oxide which is selected from the group consisting of propylene oxide and butylene oxide.

4. A process for improving the stress endurance of articles comprised essentially of ethylene oxide polymers, said polymers having a reduced viscosity value of at least 1.0 as measured at a concentration of 0.2 gram of said polymer in 100 milliliters of acetonitrile at 30° C., which comprises adding to said polymer from about 1 to about 50 weight percent, based on said polymer, of a water-soluble stress improving additive having the formula:

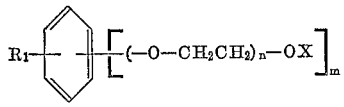

wherein $R_1$ represent a member selected from the group consisting of hydrogen and alkyl groups containing from 1 to 12 carbon atoms; X represents a member selected from the group consisting of hydrogen, lower alkyl, and alkyl-substituted and unsubstituted cycloaliphatic, heterocyclic nitrogen and aryl groups containing from 5 to 24 carbon atoms; $n$ is a whole positive integer of from 2 to 60; and $m$ is a whole positive integer of from 1 to 3.

5. The process of claim 4 wherein said additive is an alkyl-substituted phenyl polyglycol ether.

6. The process of claim 4 wherein said additive is a nonylphenyl polyglycol ether.

7. The process of claim 4 wherein said additive is a tertiary-butylphenyl polyglycol ether.

8. A composition of matter comprising essentially an ethylene oxide polymers, said polymer having a reduced viscosity value of at least 1.0 as measured at a concentration of 0.2 gram of said polymer in 100 milliliters of acetonitrile at 30° C., and from about 1 to about 50 weight percent, based on said polymer, of a water-soluble stress improving additive having the formula:

wherein R contains from 5 to 24 carbon atoms and represents a member selected from the group consisting of alkyl-substituted and unsubstituted cycloaliphatic, heterocyclic nitrogen and aryl groups; X represents a member selected from the group consisting of hydrogen, lower alkyl, and alkyl-substituted and unsubstituted cycloaliphatic, heterocyclic nitrogen and aryl groups containing 5 to 24 carbon atoms; $n$ is a whole positive integer of from 2 to 60; and $m$ is a whole positive integer of from 1 to 3.

9. The composition of claim 8 wherein said ethylene oxide polymer is solid poly(ethylene oxide).

10. The composition of claim 8 wherein said ethylene oxide polymer is a solid copolymer comprised of at least 90 weight percent of ethylene oxide in copolymerized form with up to 10 weight percent of a lower olefin oxide which is selected from the group consisting of propylene oxide and butylene oxide.

11. A composition of matter comprising essentially an ethylene oxide polymer, said polymer having a reduced viscosity value of at least 1.0 as measured at a concentration of 0.2 gram of said polymer in 100 milliliters of acetonitrile at 30° C., and from about 1 to about 50 weight percent, based on said polymer, of a water-soluble stress improving additive having the formula:

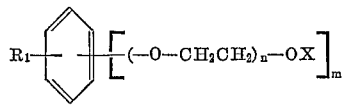

wherein $R_1$ represents a member selected from the groups consisting of hydrogen and alkyl groups containing from 1 to 12 carbon atoms; X represents a member selected from the group consisting of hydrogen, lower alkyl, and alkyl-substituted and unsubstituted cycloaliphatic, heterocyclic nitrogen and aryl groups containing from 5 to 24 carbon atoms; $n$ is a whole positive integer of from 2 to 60; and $m$ is a whole positive integer of from 1 to 3.

12. The composition of claim 11 wherein said additive is an alkyl-substituted phenyl polyglycol ether.

13. The composition of claim 11 wherein said additive is a nonylphenyl polyglycol ether.

14. The composition of claim 11 wherein said additive is a tertiary-butylphenyl polyglycol ether.

References Cited in the file of this patent
UNITED STATES PATENTS

| | | |
|---|---|---|
| 2,903,485 | Lane et al. | Sept. 8, 1959 |
| 2,934,518 | Smith | Apr. 26, 1960 |
| 2,958,684 | Kelley et al. | Nov. 1, 1960 |
| 2,965,678 | Sundberg et al. | Dec. 20, 1960 |